United States Patent [19]
Gandini

[11] 4,143,966
[45] Mar. 13, 1979

[54] ILLUMINATION DEVICE FOR PHOTOGRAPHIC COLOR APPARATUS

[75] Inventor: Mario Gandini, Brixen, Italy

[73] Assignee: Durst AG Fabrik Fototechnischer Apparate, Bozen, Italy

[21] Appl. No.: 873,554

[22] Filed: Jan. 30, 1978

[30] Foreign Application Priority Data

Feb. 17, 1977 [IT] Italy .................................. 4811 A/77

[51] Int. Cl.² .................................................. G03B 27/76
[52] U.S. Cl. ........................................ 355/35; 355/67; 355/88
[58] Field of Search .......................... 355/32, 35, 67, 88

[56] References Cited

U.S. PATENT DOCUMENTS

| | | | |
|---|---|---|---|
| 3,217,594 | 11/1965 | Simmon | 355/35 X |
| 3,273,451 | 9/1966 | Wilson | 355/35 X |
| 3,684,371 | 8/1972 | Weisglass et al. | 355/35 X |
| 3,709,601 | 1/1973 | Zahn et al. | 355/35 X |
| 3,756,719 | 9/1973 | Harter | 355/67 |
| 3,800,070 | 3/1974 | Barbieri | 355/35 X |
| 3,829,210 | 8/1974 | Langer et al. | 355/35 |
| 3,831,021 | 8/1974 | Muhlogger | 355/35 X |
| 4,050,807 | 9/1977 | Barbieri | 355/32 |

*Primary Examiner*—Richard A. Wintercorn
*Attorney, Agent, or Firm*—Connolly and Hutz

[57] ABSTRACT

An illuminating device for a color printing apparatus having color filters insertable at varying amounts into the printing light beam has a light-conducting shaft and a variable aperture diaphragm both of which have substantially rectangular cross sections whereby the color content of the printing light beam is maintained substantially uniform. The light-conducting shaft has the form of a frustum of a square pyramid and the variable aperture of the diaphragm has a rectangular form. The light source has an ellipsoidal reflector, and the light beam emerging from the illuminating device is channeled through a light mixer.

15 Claims, 2 Drawing Figures

ILLUMINATION DEVICE FOR PHOTOGRAPHIC COLOR APPARATUS

BACKGROUND OF THE INVENTION

The invention relates to an illumination device for photographic color printing, for example, enlargement or printing apparatus having color filters which can be inserted by variable amounts into the copying beam.

An illumination system of this kind is described in German Patent Specification No. 871,554, in which system the light emerging from a light source is concentrated by a condenser system and passes through an arrangement consisting of a rectangular aperture having a sliding diaphragm and three filters of maximum density each of a primary color. The sliding diaphragm consists of one or two slides, the direction of movement of which is perpendicular to the direction of movement of the filters. By suitable adjustment of the slides it is possible to obtain a continuously adjustable alteration of the brightness at the outlet of the illuminating device, without unduly altering the color balance of the copying beam. Some amount of undesirable shifting does, however, occur.

SUMMARY

The invention provides an illumination device for a color copying apparatus, which device comprises color filters in each of the substractive primary colors capable of insertion by variable amounts into the copying beam, a diaphragm capable of insertion into the copying beam in a direction perpendicular to the direction of insertion of the filters, the diaphragm and the filters being so arranged and shaped that movement of the diaphragm does not change the relative proportions of the beam uncovered, and covered by each of the filters, respectively, and a light shaft arranged in front of the diaphragm in the direction of propagation of the copying beam which shaft is so shaped that the light intensity in the outlet plane of the shaft is substantially uniformly distributed over this plane.

The arrangement of the invention enables the light intensity to be varied by the use of the diaphragm without altering the color balance of the beam to any significant extent, and without the necessity of using a condenser. Light from the source can be collected over a larger solid angle with a light shaft instead of with a condenser, and so the device of the invention can produce a significantly improved light output as compared with a condenser system. The invention allows the use of a diaphragm as specified above, in the region of narrowest constriction of the copying beam directly in front of the plane of insertion of the color filters, with an ellipsoidal reflector for the light source (such reflectors being customary in color enlargement apparatuses at present on the market). Were such a diaphragm used with such a reflector in enlarging apparatus without the light shaft specified, an inadmissible shift in the color balance would occur when the diaphragm was altered to change the light intensity, since the light intensity would not in that case be uniform over the area of the diaphragm.

The fact that the light intensity can be changed without changing the color balance of the copying beam to any practical degree is unexpected. A contributing factor may be, however, because the movement of the diaphragm does not change the relative proportions of the beam which are covered by each of the filters, and uncovered, respectively, because a substantially uniform distribution can be produced by the device in the plane of the diaphragm, and because the cross sections of the light concentrating shaft and diaphragm are coordinated with each other. Advantageously, the diaphragm is arranged below a rectangular opening of the light shaft, and the filters have a leading edge parallel to the first side of the opening and are movable in a direction parallel to a second orthogonal side, and the diaphragm has a leading edge parallel to the second side of the opening and is movable in a direction parallel to the first side.

The light-conducting shaft may be arranged in the shape of a frustum of a pyramid, tapering in the direction of propagation of the copying beam, the inner faces being specular reflecting faces, and the shaft may be formed from four sheet metal portions, each forming one of the frusto-pyramid faces, which sheet metal portions are joined together.

Advantageously, the light-concentrating shaft is also arranged in front of the filters in the direction of propagation of the copying beam. Preferably, the diaphragm is arranged immediately in front of or behind the filters in the direction of propagation of the copying beam.

BRIEF DESCRIPTION OF THE DRAWINGS

Novel features and advantages of the present invention will become apparent to one skilled in the art from a reading of the following detailed description in conjunction with the accompanying drawings wherein similar reference characters refer to similar parts and in which.

DESCRIPTION OF THE PREFERRED EMBODIMENTS

Figure 1:
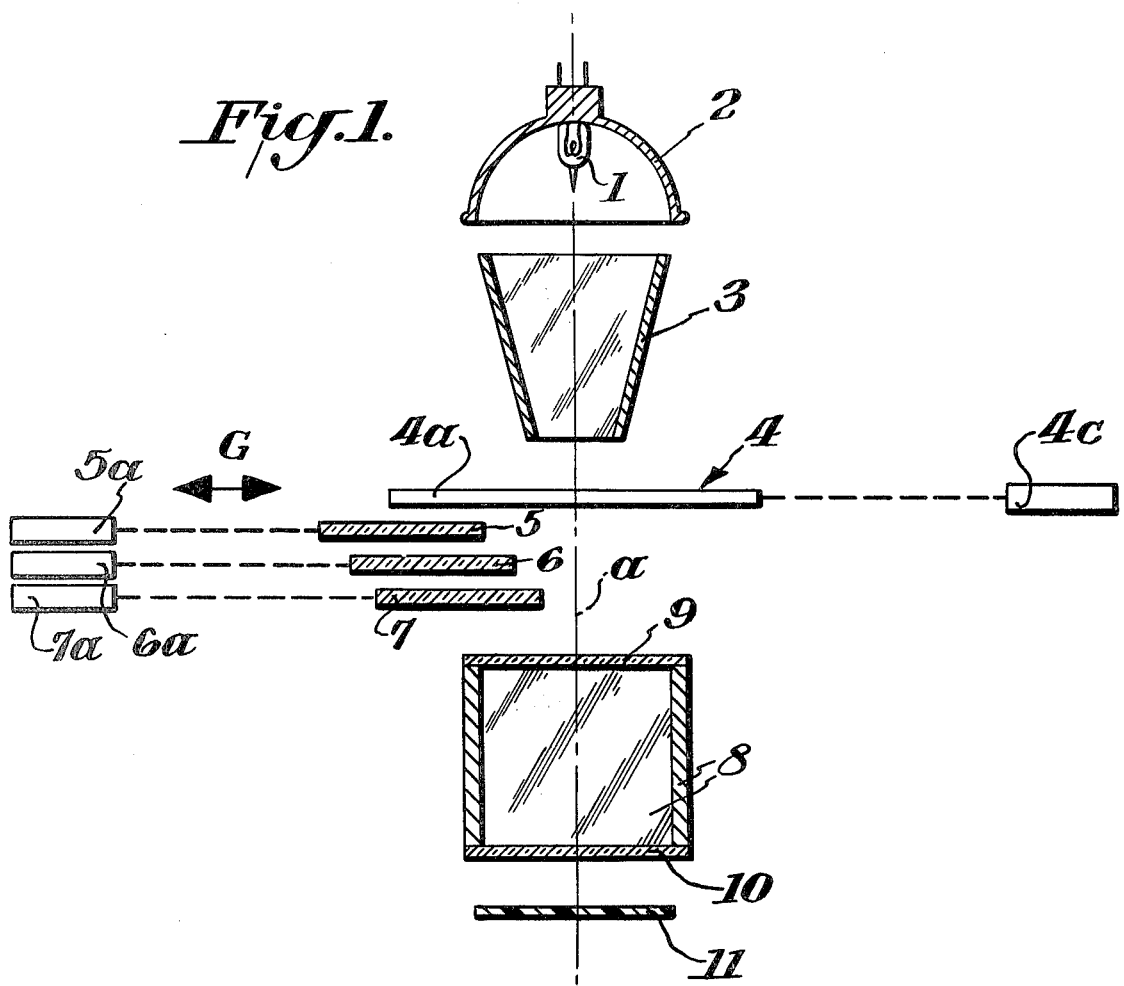
FIG. 1 is a schematic cross-sectional representation along the optical axis of an illumination device which is one embodiment of this invention.

An illumination device for a photographic enlarging apparatus comprises a light source 1 with an integral cold light ellipsoidal reflector 2. Arranged below the light source is a light-conducting shaft 3 which is in the shape of the frustum of a pyramid tapering in the direction of propagation of the light. The shaft 3 may, for example, be formed from four sheet metal portions suitably joined together with and having inner mirror faces. The length of the light conducting shaft, its position and the inclination of its lateral faces are so selected that on the light outlet side of the shaft a light intensity is produced which is substantially the same over the entire light outlet plane. Arranged directly below the light conducting shaft 3 is a diaphragm 4, which consists of two slides 4a, 4b for example which are movable in the direction of the arrows F by means of an actuating device 4c (not shown in detail) in a plane perpendicular to the optical axis a. This actuating device acts on the slides 4a, 4b in such a manner that when a reduction in brightness is desired they are moved towards one another, while when an increase in the light intensity is desired the slides are caused to move in opposite directions.

Below the diaphragm 4 it is possible to insert into the path of rays by means of an actuating device 5a, 6a, 7a, (not shown in detail), three color filters 5, 6, 7 of maximum density in a plane perpendicular to the optical axis a in the direction of arrows G. Each of these filters has a different subtractive primary color, for example, the filter 5 may be a yellow filter, the filter 6 a Magenta filter and the filter 7 a cyan filter.

The bundle of rays which, after passing through the filters, is partially colored in accordance with the extent to which the filters are inserted, is homogenized in a light mixing shaft 8 with reflecting inner walls. In order to ensure more thorough mixing of the light, the light inlet side and the light outlet side are each covered by a diffusing plate 9, 10. The cross-section of the diffusing plate 10 may be of a shape that affects the distribution of light, and represents the light outlet side of the illuminating devide. The light mixing shaft 8 may, according to the picture format, have very varied lengths and shapes which are not shown here. The image original 11 to be illuminated is arranged below the diffusing plate 10.

Figure 2:
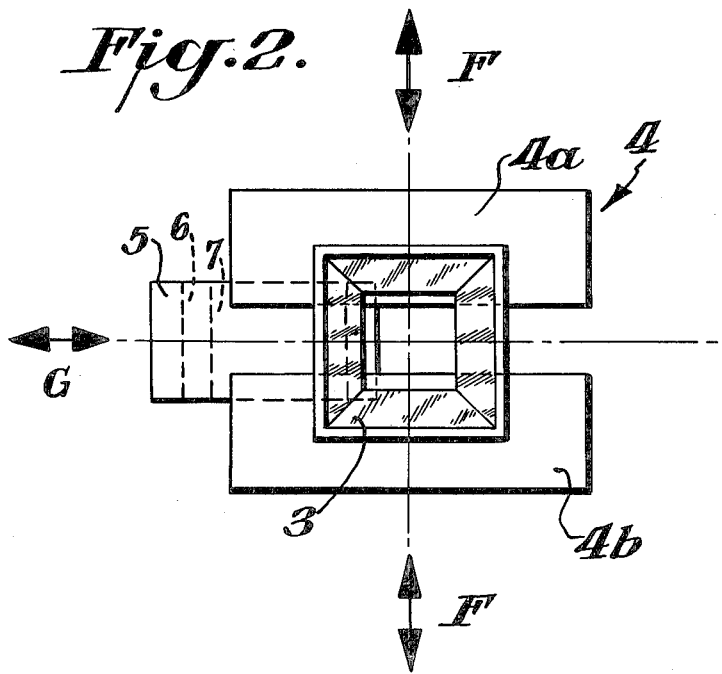
FIG. 2 is a schematic top plan view illustrating the light-conducting shaft, diaphragm and filters of the illumination device of FIG. 1.

The slides 4a, 4b are movable below a rectangular, for example, a square opening of the light conducting shaft, and the slides have a leading edge parallel to one side of the opening, and they are movable parallel to the other side. Similarly, the filters have leading edges parallel to one side of the opening and are movable parallel to the other side. Consequently, as may be appreciated by studying FIG. 2, if the slides 4a, and 4b are moved towards or away from each other, the proportion of the area of the copying beam in the region of the diaphragm that is covered by each color (not all colors need be present of course) and the proportion of the area of the copying beam that is uncovered, will be unchanged. Given a uniform light intensity also in this region, and the color balance will therefore also be unchanged.

I claim:

1. An illuminating device for a photographic color printing apparatus having color filters insertable at variable amounts into a beam of printing light to adjust its color content comprising a source of the beam of printing light, a variable aperture diaphragm disposed adjacent the color filters in the path of the printing beam for controlling the intensity of light emerging from the device, a light-conducting shaft disposed between the source and the diaphragm, and the cross sections of the light-conducting shaft and the diaphragm aperture being coordinated with each other to maintain a substantially uniform color content in the printing light beam over the entire range of variation of the diaphragm aperture.

2. An illuminating device as set forth in claim 1, wherein the cross sections of the diaphragm and light-conducting shaft are substantially rectangular.

3. An illuminating device as set forth in claim 2, wherein the cross section of the light-conducting shaft is substantially square and the cross section of the diaphragm aperture is substantially rectangular.

4. An illuminating device as set forth in claim 3, wherein the diaphragm comprises a pair of plates having substantially straight parallel adjacent edges having coordinated movements toward and away from each other in the path of the printing light beam whereby the variable rectangular aperture is provided.

5. An illuminating device as set forth in claim 1, wherein the color filters have a first direction of movement into and out of the light beam, the diaphragm having movable plates which are movable in a second direction into and out of the printing light beam, and the first and second directions of movement being angularly spaced from each other.

6. An illuminating device as set forth in claim 5, wherein the first and second directions of movement are spaced substantially perpendicularly to each other.

7. An illuminating device as set forth in claim 6, wherein the cross sections of the light-conducting shaft and the aperture of the diaphragm are substantially rectangular.

8. An illuminating device as set forth in claim 1, wherein the light-conducting shaft has the form of a frustum of a pyramid, and the light-conducting shaft tapers inwardly from the source to the diaphragm whereby the diaphragm is disposed substantially in the most constricted portion of the printing light beam.

9. An illuminating device as set forth in claim 8, wherein the light-conducting shaft has a substantially rectangular cross section.

10. An illuminating device as set forth in claim 9, wherein the light-conducting shaft has a substantially square cross section.

11. An illuminating device as set forth in claim 1, wherein the diaphragm is disposed between the light-conducting shaft and the color filters.

12. An illuminating device as set forth in claim 1, wherein a light mixing shaft is disposed in the path of the printing light beam emerging from the device.

13. An illuminating device as set forth in claim 1, wherein the light source incorporates an ellipsoidal reflector.

14. An illuminating device as set forth in claim 1, wherein the color filters have a relatively high density.

15. An illuminating device as set forth in claim 1, wherein the color filters have an extremely high density.

* * * * *